United States Patent [19]

Farmer et al.

[11] Patent Number: 5,682,485
[45] Date of Patent: Oct. 28, 1997

[54] DEADLOCK AVOIDANCE FOR SWITCHED INTERCONNECT BUS SYSTEMS

[75] Inventors: Michael Edward Farmer, Eagan; Steven Allen Murphy; Rick Clevie Stevens, both of Apple Valley, all of Minn.

[73] Assignee: Unisys Corporation, Blue Bell, Pa.

[21] Appl. No.: 692,988

[22] Filed: Aug. 7, 1996

Related U.S. Application Data

[63] Continuation of Ser. No. 347,669, Dec. 1, 1994, abandoned.
[51] Int. Cl.$^6$ .................................................. G06F 13/00
[52] U.S. Cl. ........................ 395/311; 395/290; 395/310; 395/312
[58] Field of Search ........................... 395/290, 310, 395/311, 312

[56] References Cited

U.S. PATENT DOCUMENTS

| | | | |
|---|---|---|---|
| 4,494,193 | 1/1985 | Brahm et al. | 364/200 |
| 5,081,575 | 1/1992 | Hiller et al. | 395/325 |
| 5,175,837 | 12/1992 | Arnold et al. | 395/425 |
| 5,179,669 | 1/1993 | Peters | 395/325 |

*Primary Examiner*—Jack B. Harvey
*Assistant Examiner*—John Travis
*Attorney, Agent, or Firm*—Charles A. Johnson; Mark T. Starr

[57] ABSTRACT

A deadlock avoidance system for avoiding interconnection deadlocks between a plurality of data transfer devices includes a controller, a switch interconnector coupled to all of said data transfer devices for interconnecting on a one-to-one basis selected ones of the data transfer device as requesting units to selected ones of said data transfer devices as receiving units. A transfer queue is employed that includes a master transfer register and a slave transfer register, a master register, a slave register and a target register.

13 Claims, 6 Drawing Sheets

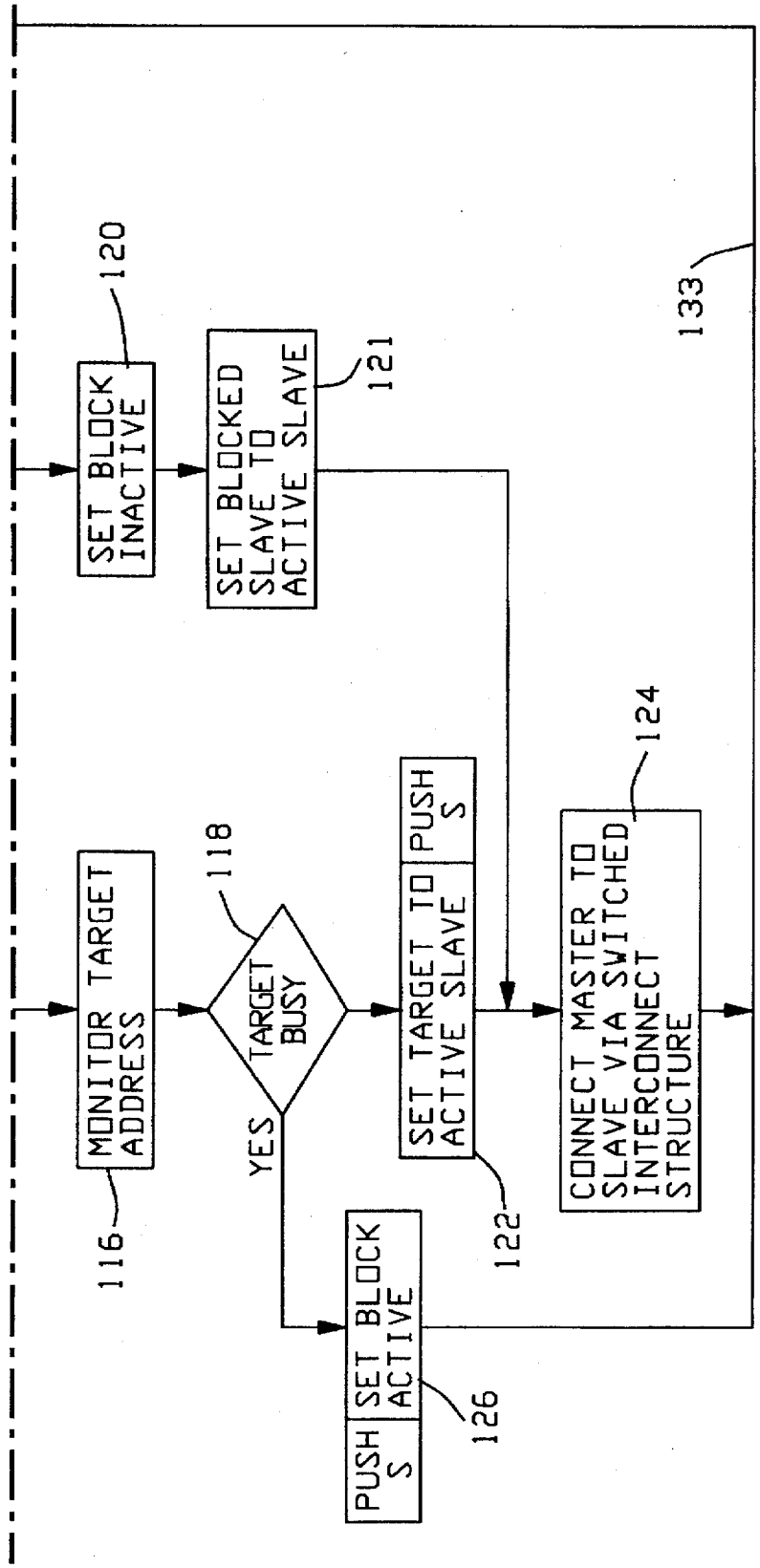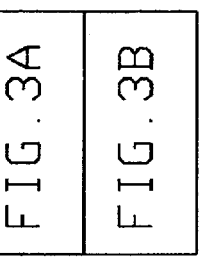

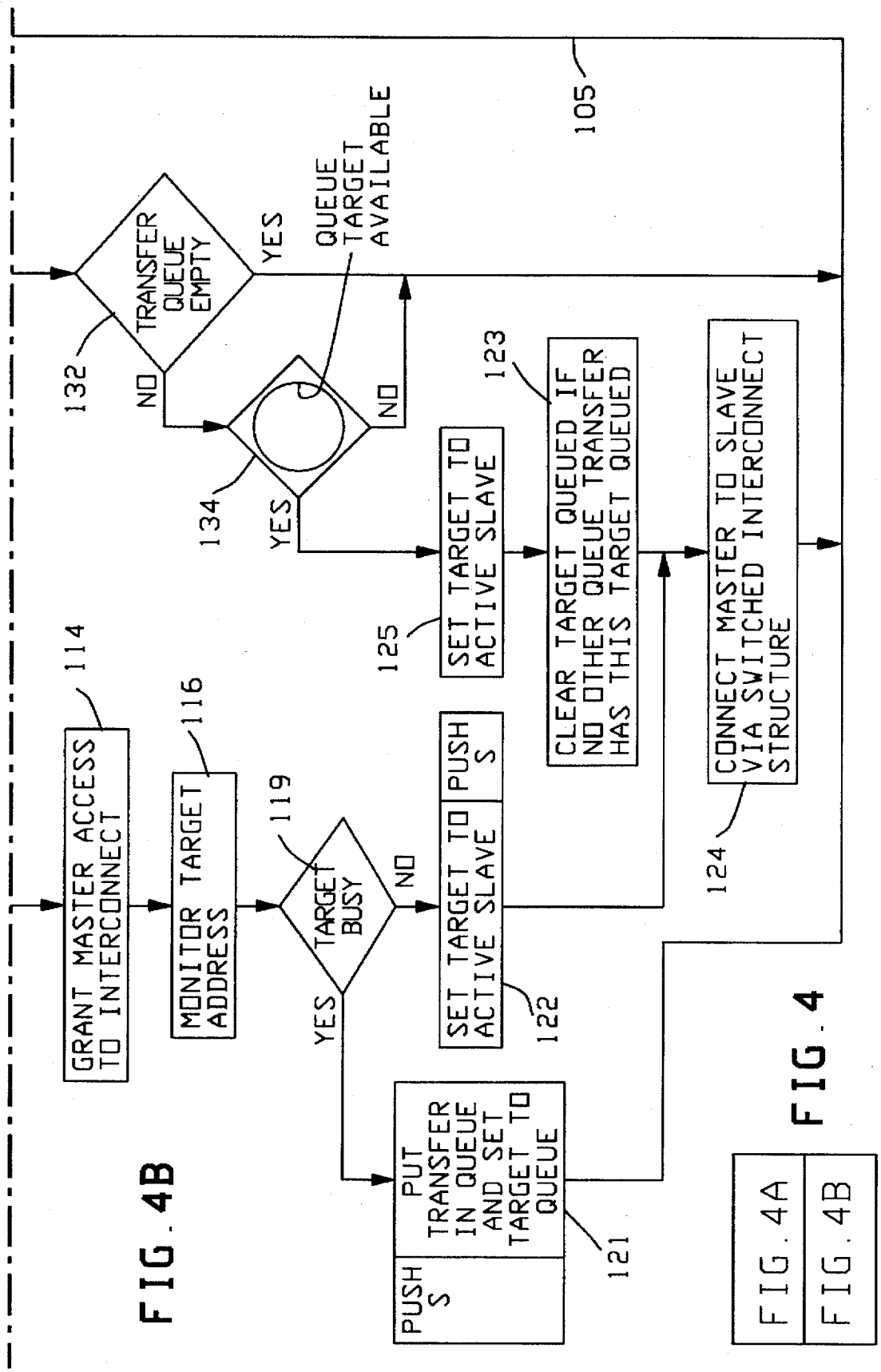

DEADLOCK AVOIDANCE FOR SWITCHED INTERCONNECT BUS SYSTEMS

This is a continuation of application Ser. No. 08/347,669 filed on Dec. 1, 1994, now abandoned.

FIELD OF THE INVENTION

This invention is directed to communication networks in which request and response signals are sent over the same bus lines. Particularly, it is directed to preventing deadlock from occurring when two cards are issuing conflicting read requests on such a bus.

BACKGROUND OF THE INVENTION

There are network bus systems which have common request and response transmission over the same bus lines. Examples of this type of bus include the VME bus and the PI-bus systems. When two cards attempt to access each other at the same time on such buses, deadlock can occur. For example, if card 1 makes a read request to its local bus, this will tie up that bus while waiting for a response from card 2. However, if card 2 were to make a read request to its local bus that tied up that bus, the request from card 1 could not get to card 2, and correspondingly the request from card 2 will not get to card 1.

Two solutions have been generally employed to overcome such deadlock situations. One way is to allow only one request to be in the bus at any given time which results in very low performance. The second method is to use time-outs with a predetermined duration during which access is granted to any of the cards after deadlock is detected. The request is periodically re-tried and consequently, since such time-outs can be for long periods of time, this system can also result in low performance. Furthermore, with the latter system, there is no guarantee that such retries won't cause deadlock as well.

BRIEF DESCRIPTION OF THE DRAWINGS

The invention is shown by reference to the drawings in which.

SUMMARY OF THE INVENTION

A deadlock avoidance system for avoiding interconnection deadlocks between a plurality of data transfer devices is formed employing a controller, a switch interconnector coupled to all of said data transfer device on a one-to-one basis, a transfer queue that includes a master transfer register and a slave transfer register, a master register, a slave register and a target register. The transfer master and slave registers contain data that specify active requesting and receiving data transfer devices. The master register contains data that specify active requesting units and the slave register contains data that specify active receiving units. The controller supplies data to the master transfer register, the slave transfer register, the master register and the slave register and a remote source of interconnector requests for interconnection of selected ones of said data transfer devices to others through the switch interconnect. The system further implements a process which determines when a deadlock condition occurs due to the identity of the data transfer device in a request.

The process determines when a deadlock condition occurs due to the identity of the data transfer means involved in a request by a method of:

(1) disregarding any requested receiving units that are currently active, (2) selecting one of one or more requested requesting units and placing data in said master register to indicate the selected one of said requesting units, and (3) determining if a requested receiving unit is active as either a requesting or a receiving unit, and after said receiving unit is no longer active, placing data in said slave register to indicate the selected one of said receiving units and interconnecting the requesting unit to the receiving unit through said switch interconnection.

TECHNICAL DESCRIPTION OF THE INVENTION

Figure 1:
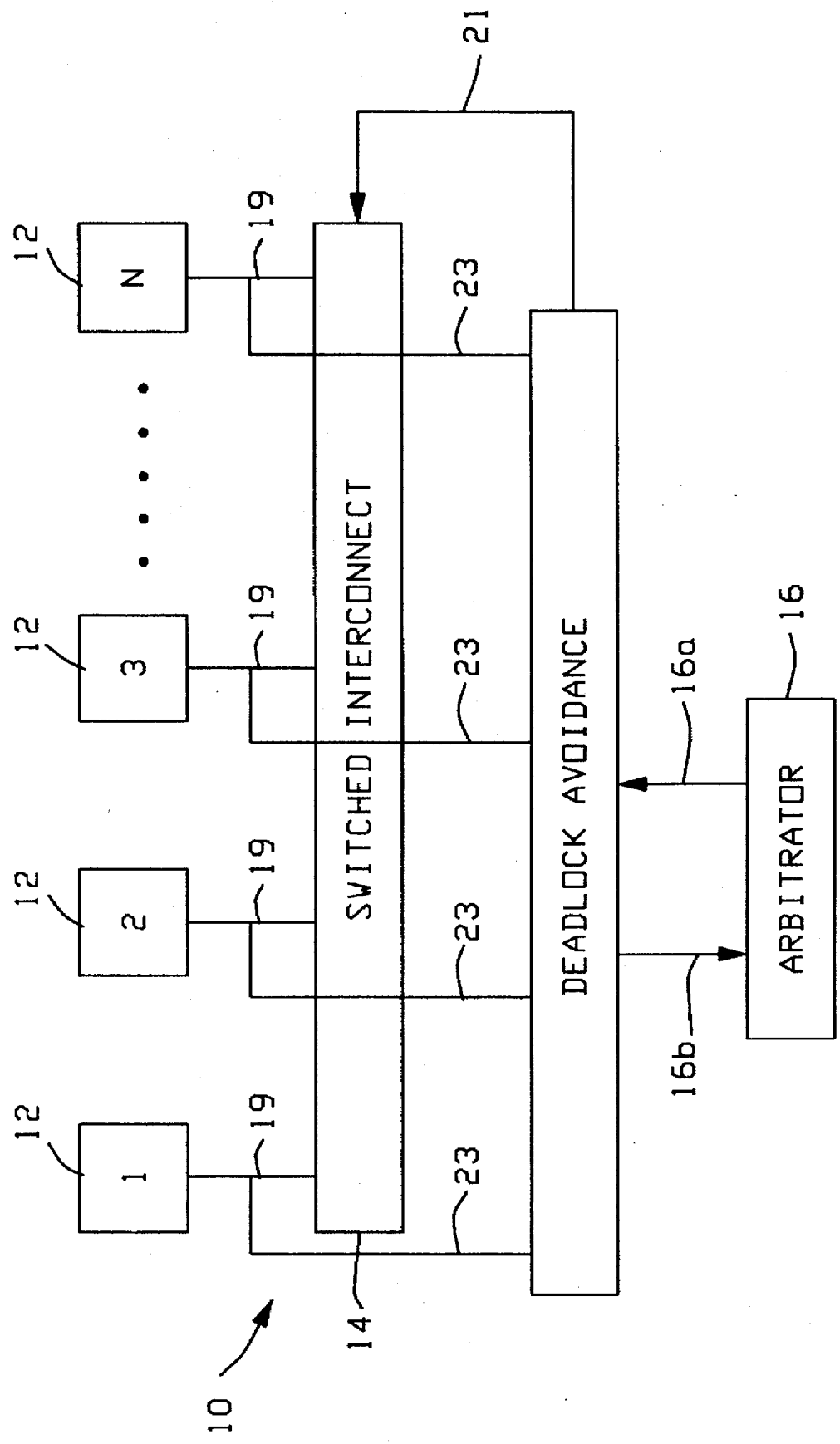
FIG. 1 is a block diagram of a system that utilizes the deadlock avoidance apparatus of the invention.

The invention is described by reference to the drawings in which FIG. 1 shows a block diagram representation of a network bus which has a common request and response paths. Representative examples of such buses are the VME bus and the PI-bus, systems which are in widespread use. In such bus systems, a number of cards 12, which are numbered 1, 2, 3 . . . N in FIG. 1, are employed. Each of the cards 12 may issue read requests to the memory of any of the other cards 12. The interconnections between the cards may be made through a switch interconnect 14 of conventional cross-bar switches. The switches of the switch interconnect 14 are operated in response to requests that originate on the cards 12. These requests are conditioned through the deadlock avoidance logic 20 and presented to the arbitrator 16 for request selection. The next selected request is sent to the deadlock avoidance logic 20 for status updating and subsequent switch interconnect configuration 21. There are many well known types of arbitration techniques which may be used by the arbitrator 16 to determine which of the cards 12 will be serviced at a given time.

The problem solved by the present invention arises because deadlock is possible in such a system. For example, if card 1 tries to read from card 2 while card 2 is also trying to read from card 1 deadlock will occur. Some bus systems, such as VME bus systems, have no inherent way of resolving two simultaneous requests involving the same two cards as master/slave and slave/master. The present invention provides a solution to this problem through a unique deadlock avoidance apparatus and technique.

Figure 2:
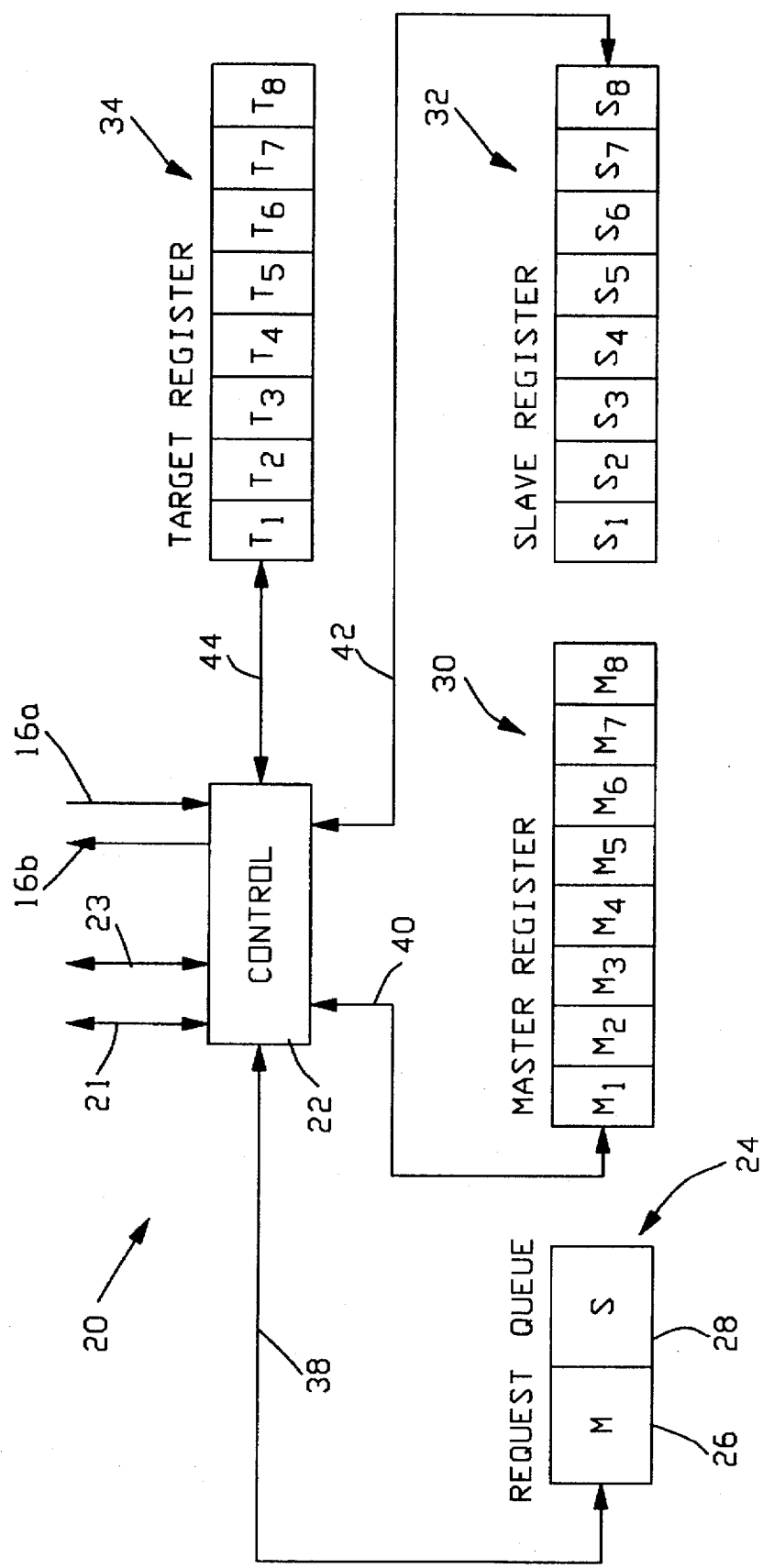
FIG. 2 is a block diagram of components that are employed in the deadlock avoidance apparatus of FIG. 1.

FIG. 2 shows an embodiment of the internal construction of the deadlock avoidance system 20 of FIG. 1. The deadlock avoidance system includes a controller 22 and a request queue 24. The request queue 24 consists of two separate request queues, a master request queue 26, designated with the letter "M", and a slave request queue 28, designated with the letter "S". In addition, there are three other registers 30, 32 and 34 in the system. In the illustrated embodiment, there are eight fields to each register, but the number of fields of the registers is dependent on the number of cards 12 that are connected to the switched interconnect network 14. These registers are called the master register 30, the slave register 32 and the target register 34.

The operation of the circuit of FIG. 2 is described by reference to the table in the specification. The controller 22, which receives request signals from each of the cards 12 via the VME bus 23, controls the supply of switching information to the registers and to the switched interconnect 14. The cards 12 have data processing (not shown) on them. The transfer of switch interconnect information to configure the switched interconnect 14 is achieved via interface 21. Information from the controller 22 for storing master and slave data requests in the request queue 24 is supplied on the interface 38 which runs between the controller 22 and the request queue 24. In a similar manner information is exchanged between the controller 22 and the master register 30 over the interface 40, with the slave register 32 over the interface 42, and with the target register 34 over the interface 44.

The lines between the cards 12 and the interconnect 14 represent the interconnect switching lines between the cards 19. These lines each represent a separate VME bus attached to each card 12. These could be arranged with any desired "PUSH" and POP in these Figures refers to the "pushing" data onto, or "popping" data off of the M and S request queues 26, 28. Such processes may be implemented entirely in the controller 22, which would then also function to control the transfer of information through the switch interconnect 14.

Figure 3A:
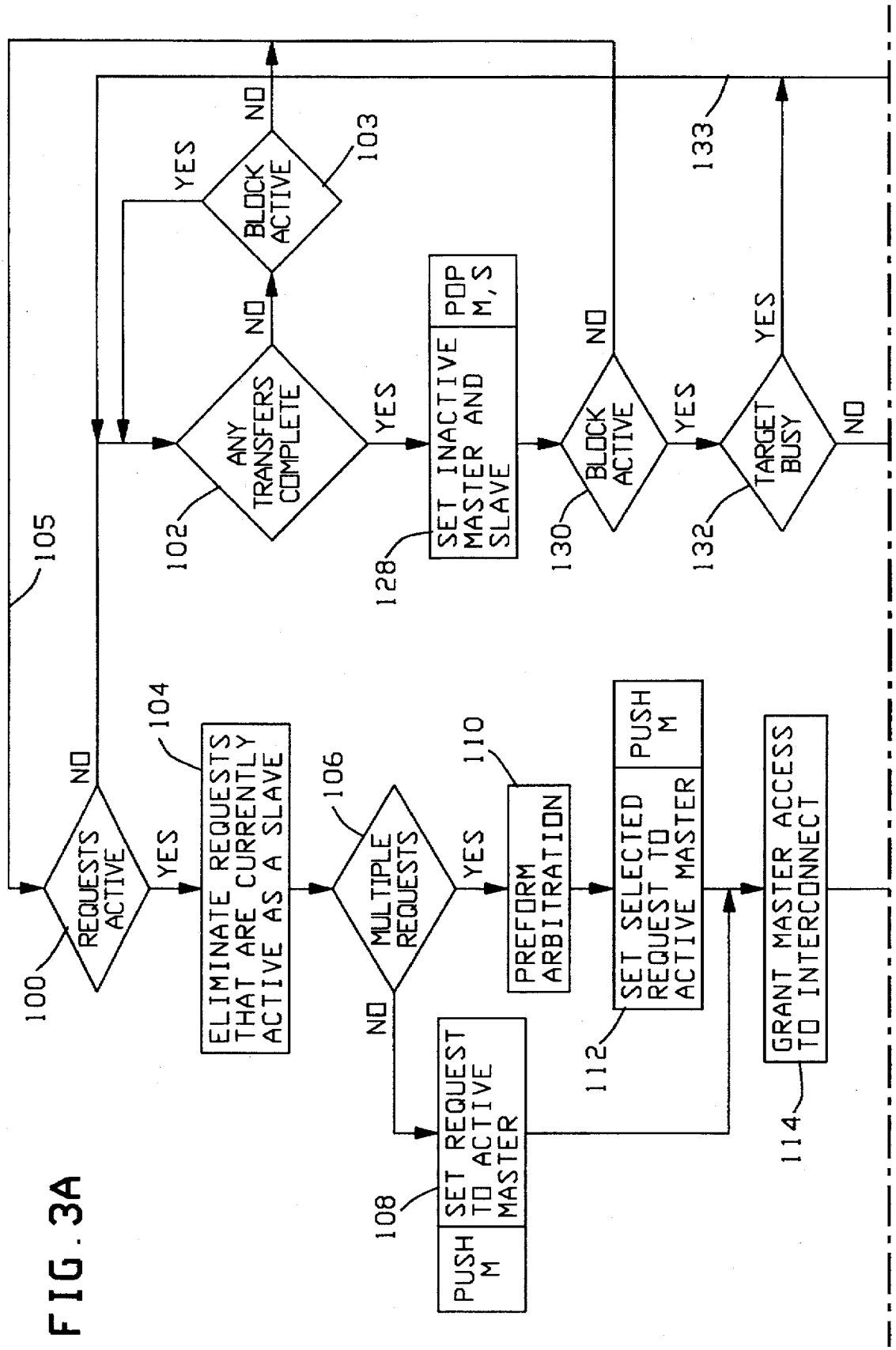
FIG. 3 is a flow-chart that illustrates the operation of one embodiment of the invention in which processing continues until requests are blocked.
Figure 4A:
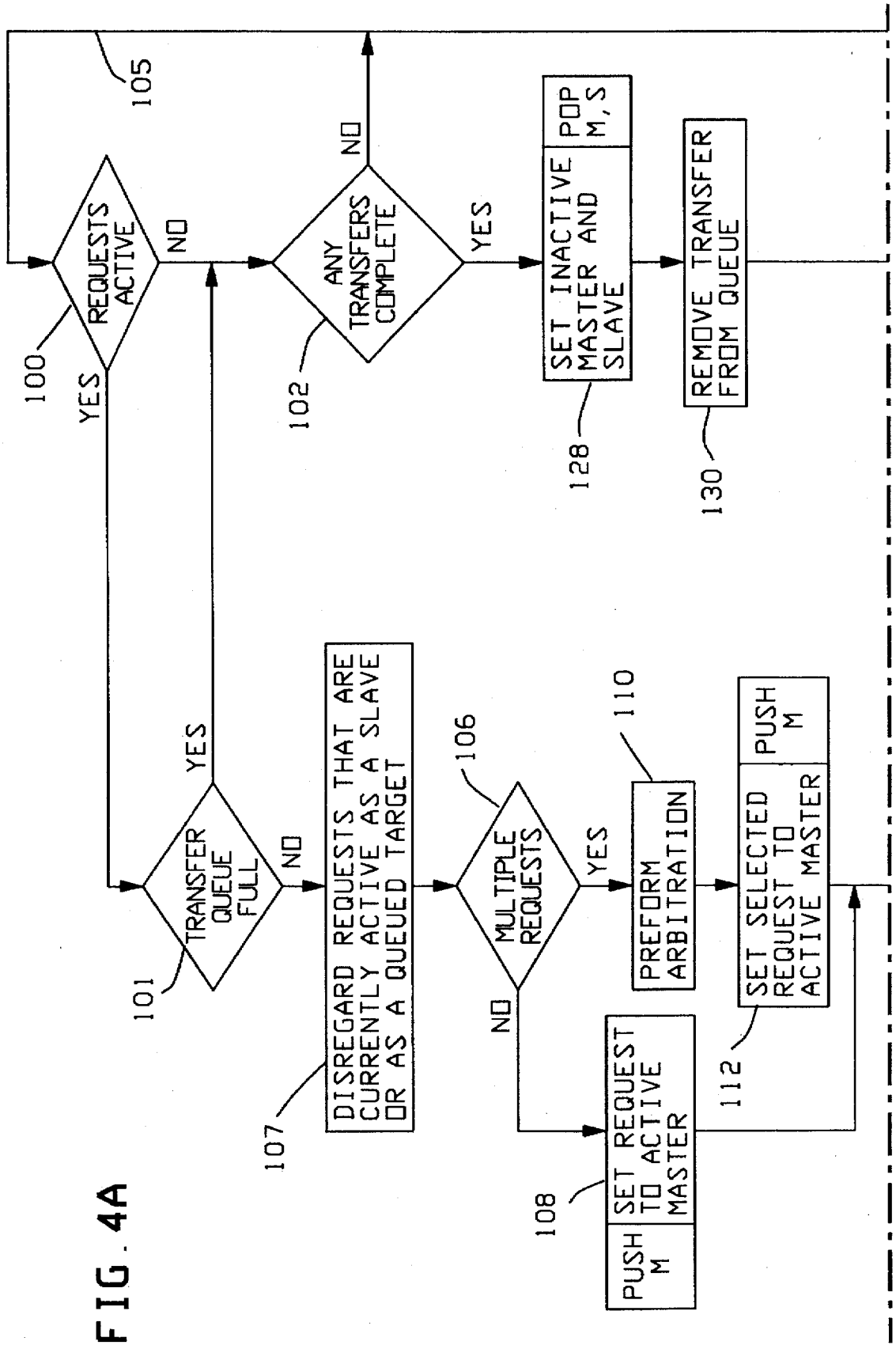
FIG. 4 is a flow-chart that illustrates the operation of another embodiment of the invention in which queues control the processing of requests.

The following Table will be used to describe the operation of both the embodiment of FIG. 3 and the embodiment of FIG. 4. In the embodiment of FIG. 3, there is no target register since only the master and slave registers are employed. The embodiment of FIG. 3 is an improvement over a linear bus when there are simultaneous requests for the interconnect, as long as all of the requests are independent and do not involve the same cards either as a master or as a slave, the requested interconnection will be accomplished.

TABLE

|  | Transfer Queue | | Master Register | | | | | | | | | Slave Register | | | | | | | | Target Register | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- |
|  | M | S | $M_1$ | $M_2$ | $M_3$ | $M_4$ | $M_5$ | $M_6$ | $M_7$ | $M_8$ | $S_1$ | $S_2$ | $S_3$ | $S_4$ | $S_5$ | $S_6$ | $S_7$ | $S_8$ | $T_1$ | $T_2$ | $T_3$ | $T_4$ | $T_5$ | $T_6$ | $T_7$ | $T_8$ |
| REQ 1 TO 2 ACTIVE | 1 | 2 | 1 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| REQ 3 TO 4 ACTIVE | 1<br>3 | 2<br>4 | 1 | 0 | 1 | 0 | 0 | 0 | 0 | 0 | 0 | 1 | 0 | 1 | 0 | 0 | 0 | 0 | 0 | 0 | 0 | 0 | 0 | 0 | 0 | 0 |
| REQ 5 TO 3 ACTIVE/ BLOCKED | 1<br>3<br>5 | 2<br>4<br>3 | 1 | 0 | 1 | 0 | 1 | 0 | 0 | 0 | 0 | 1 | 0 | 1 | 0 | 0 | 0 | 0 | 0 | 0 | 1 | 0 | 0 | 0 | 0 | 0 |
| REQ 6 TO 7 ACTIVE | 1<br>3<br>5<br>6 | 2<br>4<br>3<br>7 | 1 | 0 | 1 | 0 | 1 | 1 | 0 | 0 | 0 | 1 | 0 | 1 | 0 | 0 | 1 | 0 | 0 | 0 | 1 | 0 | 0 | 0 | 0 | 0 |
| REQ 1 TO 2 COMPLETE | 3<br>5<br>6 | 4<br>3<br>7 | 0 | 0 | 1 | 0 | 1 | 1 | 0 | 0 | 0 | 0 | 0 | 1 | 0 | 0 | 1 | 0 | 0 | 0 | 1 | 0 | 0 | 0 | 0 | 0 |
| REQ 3 TO 4 COMPLETE/ REQ 5 TO 3 ACTIVE | 5<br>6 | 3<br>7 | 0 | 0 | 0 | 0 | 1 | 1 | 0 | 0 | 0 | 0 | 1 | 0 | 0 | 0 | 1 | 0 | 0 | 0 | 0 | 0 | 0 | 0 | 0 | 0 |
| REQ 5 TO 3 COMPLETE | 6 | 7 | 0 | 0 | 0 | 0 | 0 | 1 | 0 | 0 | 0 | 0 | 0 | 0 | 0 | 0 | 1 | 0 | 0 | 0 | 0 | 0 | 0 | 0 | 0 | 0 |
| REQ 6 TO 7 COMPLETE | X | X | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | switched interconnect structure, such as crossbar switches, multi-stage interconnect networks, layered networks, etc. The lines 23 are employed to provide information to the deadlock avoidance circuit as to the current status of each separate VME bus so that the deadlock avoidance circuit will know whether a given VME bus interface 19 to each card 12 has a request active or not.

The request queues 26 and 28, are labelled M and S in the table, and may be several stages deep. The depth of these queues is dependent on the amount of queuing that is required for the bus and deadlock avoidance technique employed. In a first embodiment of this invention, transfers are queued until a blocked transfer is detected. At this point, no other transfers are initiated until the blocked resource is released. This embodiment does allow multiple transfers, but it does not allow a non-blocked transfer to occur if preceded by a blocked transfer and, therefore, does not maximize bandwidth potential. The technique of implementing the first embodiment is shown in FIG. 3, and the technique of implementing the second embodiment is shown in FIG. 4.

In FIGS. 3 and 4 operation of the preferred embodiments of the invention is described with reference to flow charts.

Referring to the Table, the first event which occurs is labelled E1. This is a request for card 1 to be connected to card 2. Thus, event E1 is labelled "REQ 1 to 2 ACTIVE." In response to this request, the digital value representative of card 1 is stored in the transfer queue field and the digital value representative of card 2 is stored in transfer queue field S. The controller 22 then enters a binary 1 value in the field $M_1$ of the master register corresponding to card 1. This indicates that card 1 has been assigned as bus master. After card 1 has been granted bus mastership, the master transfer is monitored for the target address. At this time the corresponding field $S_2$ of the slave register for the target address, card 2, is set to a digital 1.

Proceeding with the illustrated operating example, the second event, E2 next occurs when a request is issued for card 3 to be coupled to card 4 (REQ 3 to 4 ACTIVE). Since no intervening event has occurred, it is apparent that both of the requests can be simultaneously active. Thus, the field $M_3$ of the master register corresponding to card 3 will be set to a 1, and after mastership has been granted, the field $S_4$ of the slave register will be set to a 1 corresponding to a target of card 4.

Following this a third event, E3, occurs while both of the first two requests are still active. Event 3 is a request for card 5 to be interconnected to card 3 (REQ 5 to 3 ACTIVE). The corresponding numbers 5 and 3 are then entered into the transfer queue fields M and S, respectively. As before, the corresponding stage, $M_5$, of the master register and the corresponding stage of the slave register, $S_3$, would be set to a binary 1 if there was no blockage, and card 3 could then be accessed by card 5. However, in accordance with the embodiment of FIG. 3 (which does not utilize the target register), the binary 1 entry is made into the master register stage $M_5$, but because the master $M_3$ is activated, entry of a binary 1 into the stage $S_3$ of the slave register is denied. The system is then said to be "blocked," and no further requests will be accepted by the system until the blockage is removed by completion of the second request which occurred at event E2.

When the card 3 has been interconnected with the card 4 and the transfer of information from switch stage 3 to switch stage 4 has been completed, the stage $M_3$ of the master register will be again set to a binary 0, as will switch stage $S_4$ of the slave register. At this point, the blocked event E3 would no longer be blocked, and this request would be accepted by the system. The table, therefore, is representative of an example that involves only the first three events, E1, E2 and E3, with respect to the embodiment of FIG. 3.

The process of the embodiment of FIG. 3 begins at the step 100 where the cards 12 are monitored by the controller 22 to determine whether any requests are active. Assuming an ongoing process, it is possible that there may be no requests active, but that prior requests may not have been completed. For this reason if the request active determination step 100 indicates a "no," the status of the registers and the transfer queues must still be monitored at step 102 to determine if any transfers have been completed during the monitoring period. If no requests are active and no transfers are completed during the monitoring period, the process recycles on itself, as indicated by the line 105, and monitoring continues in the next time frame.

Assuming that an active request is initially detected at step 100, step 104 is performed so that any requests that are currently active as a slave will be rejected by the system and will not be accepted. This eliminates situations where, for example, card 1 could make a request to be connected to card 2, this request is accepted, and subsequently card 2 could be subject to a request to be connected to card 1. At the step 104 if the request from card 1 to card 2 has been accepted and is active, a subsequent request of card 2 for card 1 is received, then the request for card 2 to be connected to card 1 will be temporarily disregarded or masked. When card 2 is no longer a slave card, the request will be enabled as unmasked into the processing stream and processing will continue to step 106.

Step 106 is a step which determines whether or not there are multiple requests. If multiple requests do not exist, step 108 will process the request to set the field M of the master register that corresponds to the requesting card to a binary 1. In the event that there are multiple requests, an arbitration will be performed by the arbitrator 16 in the step 110. Any type of arbitration scheme, such as rotating, fair, least recently used or other type of arbitration, may be performed.

Once a requested switch has been selected by the arbitrator 16, step 112 allows that request to set the selected field M of the master register to a binary 1. Once the master register field M bit has been set and the digital value representative of the selected card has been pushed into the transfer queue field M through the step 108 or the step 112 occurs, the corresponding master card is granted access to the switched interconnect network 14 at the step 114. At the next step 116 the target address of the target register is monitored. The necessity for monitoring the target address arises because if a particular slave card has been connected to a master card due to a prior request, it cannot be utilized again until the prior transaction has been completed and the card has been released.

If during step 118 it is determined that the requested target address is busy, then the requested target address value will be pushed into the corresponding transfer queue field S, and the blocked condition will be set active. At the next step 102, if any transfers complete, the step 128 would be processed, otherwise step 103 would be utilized to continue to monitor for completed transfers until the block is removed. At step 128 the corresponding M and S bits of the master and slave registers will be set to a 0. Additionally, the corresponding M and S fields of the request queue will be popped or removed. This is the completion of this transfer. Next, since the block is still active, step 132 will monitor the status of the S bit of the slave register corresponding to the blocked transfer to see if the slave is busy. If the completed transfer freed up the blocking slave, then step 120 will set the block inactive, step 121 will set the blocked slave active in the slave register, and step 124 will use switched interconnect 14 to connect the master card to the slave card it requested.

If during step 118 it is determined that the requested target address is not busy, then step 122 will set the corresponding bit in the slave register to a binary 1 to indicate that the target card is busy. Subsequently, at step 124 the switched interconnect 14 will be used to connect the master card to the slave card it requested. After step 124 the process loops back on, as indicated by the line 133, to the step 102. If no transfers are complete and the blocked condition is not active at step 103, then the process moves to step 100. If there are any transfers complete, then at step 128 the corresponding M and S bits of the master and slave registers will be set to a 0. Additionally, the corresponding M and S fields of the transfer queue will be popped or removed. Next, if the blocked condition is not achieved at step 130, then the process moves to step 100.

A second embodiment of the present invention is described with reference to the table and FIG. 4. In this implementation all of the events E1–E8 of the table are utilized in the example. Additionally, the target register is utilized. The embodiment of FIG. 4 does not rely on a blocking active signal as does the embodiment of FIG. 3. Instead, it employs an added target register and the transfer queue will also generally have more stage depth.

In the embodiment of FIG. 4, there is an additional step 101 which is a decision step that indicates when the transfer queue is filled. If the request queue is not filled, the process proceeds to step 107. Step 107 is similar to step 104 in that it disregards requests that are currently active as a slave card, but in addition it also disregards requests in which a queued target address stage of the target register is active.

The following processing steps 106, 108, 110, 112, 114, 116 and 118 continue in the manner of the same steps described for the embodiment of FIG. 3. The decision step 119 is similar to the decision step 118, but, in addition to monitoring the master and slave register at this step, the target register must also be monitored.

If the master, slave and target register bits corresponding to the target address are not active, then the process continues to step 122. At this step the target address bit in the slave register is set active. If the transfer queue is not empty at step 132 and a queued target is now available, then step 125 sets the target to an active slave in the slave register, the target is cleared from the target register in step 123. If there is no other request for the same switch that is represented by one of the bits $T_1$–$T_8$ of the target register, the connection of the master card to the slave card is made in step 124. Otherwise, the process may be recycled through the steps 100 and 102 until the target card in the queue is available. The connection of the master card to the slave card occurs in step 124. In the event that there are no active requests at this step, then the process recycles, as indicated by line 105 back to step 100 and then to step 102. The process then continues through step 128, which is the same step as in the prior process. Upon setting the appropriate master register and slave register bits to a binary 0 in step 128, the corresponding requests are removed from the transfer queue in step 130.

What is claimed is:

1. A deadlock avoidance system for avoiding interconnection deadlocks between a plurality of data transfer units, selectable ones of the data transfer units being capable of controlling requests as active requesting units to predetermined other selectable receiving ones of the data transfer units and also being capable of responding as active receiving units to requests from still other selectable ones of the data transfer units, comprising:

a controller having data supplying circuits;

a switch interconnector coupled to all of the plurality of data transfer units for interconnecting on a one-to-one basis selected ones of the plurality of data transfer units as active requesting units to selected ones of the plurality of data transfer units as active receiving units, a transfer queue device that includes a master request queue storage device and a slave request queue storage device, a master register, a slave register and a target register, wherein:

(a) said master request queue storage device to contain data entries for identifying active requesting units, said slave request queue storage device to contain data entries for identifying active receiving units, wherein each entry in said master request queue storage device is associated with an entry in said slave request queue storage device such that the associated entries describe an active or pending data transfer, (b) said master register to contain data for identifying active requesting units, and (c) said slave register to contain data for identifying active receiving units and wherein said data supplying circuits of said controller is coupled to said master request queue storage device, said slave request queue storage device, said master register and said slave register to provide for interconnection of selected ones of the plurality of data transfer units to others of the plurality of data transfer units through said switch interconnector and for placing data in all of said registers, the system further comprising an implemented software process which uses the identity of the requesting data transfer units to avoid a potential deadlock situation by a method of:

(1) disregarding any requests from active receiving units, (2) selecting one of one or more requests from said requesting data transfer units and placing data in said master register to indicate said selected one of said requesting data transfer units is an active requesting unit, and (3) determining if a requested receiving data transfer unit is either an active requesting unit or an active receiving unit, and after said requested receiving data transfer unit is no longer active, placing data in said slave register to indicate said requested receiving data transfer unit is an active receiving unit and interconnecting said selected one of said requesting data transfer units to said requested receiving data transfer unit through said switch interconnector.

2. A deadlock avoidance system as claimed in claim 1 wherein said software process blocks further interconnection between said requesting data transfer units and said requested receiving data transfer units whenever said requested receiving data transfer units are already active requesting units or active receiving units.

3. A deadlock avoidance system as claimed in claim 1 wherein the system further comprises a target register to couple to said data supplying circuits, and said data supplying circuits are constructed to supply data to said target register, said target register to contain data for identifying said requested receiving data transfer units that are active requesting units or active receiving units at the time a new request is issued for said requested receiving data transfer units, and said software process monitors said target register, said master transfer register and said slave transfer register and interconnects said requesting data transfer units and said requested receiving data transfer units when said requested receiving data transfer units are no longer active receiving units or active requesting units.

4. A deadlock avoidance system as claimed in any of the preceding claims 1, 2, or 3 in which said software process disregards multiple requests to the same said requested receiving data transfer unit before said requesting data transfer unit may be interconnected to said requested receiving data transfer unit.

5. A deadlock avoidance system as claimed in claim 4 in which said software process after disregarding said multiple requests to said same requested receiving data transfer unit performs arbitration on simultaneous requests.

6. For use with a system having a plurality of data transfer units coupled to a switch interconnector, the switch interconnector for interconnecting ones of the plurality of data transfer units as active requesters to other associated ones of the plurality of data transfer units as active receivers in response to requests by requesting ones of the plurality of data transfer units for interconnection to associated requested ones of the plurality of data transfer units, the system further having predetermined ones of the plurality of data transfer units being capable of operating as both active requesters and active receivers, a deadlock avoidance system for preventing interconnection deadlocks formed by a first data transfer unit requesting interconnection to a second data transfer unit while the second data transfer unit is requesting interconnection to the first data transfer unit, comprising:

recording means for recording the identity of active requesters and active receivers;

request receiving means coupled to said recording means for receiving requests from requesting ones of the plurality of data transfer units, and for masking requests from requesting ones of the plurality of data transfer units that are active receivers;

arbitration means coupled to said request receiving means for selecting a request from said request receiving means as the next active request, for designating the requesting one of the plurality of data transfer units for said next active request as the next requester, for connecting said next requester to the switch interconnector, and for recording in said recording means said identity of said next requester as an active requester;

request grant means coupled to said request receiving means for designating the requested one of the plurality of data transfer units for said next active request as the next receiver, and for determining whether said next receiver is an active requester or an active receiver, and after said next receiver is no longer an active requester or an active receiver, connecting said next receiver to said next requester through the switch interconnector and recording said identity of said next receiver in said recording means as an active receiver; and monitoring means for determining when a request is complete, and when a request is complete, for disconnecting the active requester and the active receiver from the switch interconnector and for further removing said identities of the active requester and the active receiver from said recording means.

7. The deadlock avoidance system as in claim 6, wherein said arbitration means is prevented from selecting another request as long as said next receiver is an active requester or an active receiver.

8. The deadlock avoidance system as in claim 6, and further comprising second recording means for recording said identity of said next receiver as a blocked target unit when said next receiver is an active requester or an active receiver; and wherein said request receiving means further includes means for masking requests from requesting ones of the plurality of data transfer units when requesting ones of the plurality of data transfer units are said blocked target units.

9. The deadlock avoidance system as in claim 6 or claim 8 wherein said recording means comprises a first storage means for containing data signals specifying active requesters, a second storage means for containing data signals specifying active receivers, and a third storage means for containing data signals specifying requests.

10. The deadlock avoidance system as in claim 8 wherein said data signals specifying each of the requests include predetermined ones of said data signals specifying a requesting one of the plurality of data transfer units and predetermined other ones of said data signals specifying the associated requested one of the plurality of data transfer units.

11. For use in a system having a plurality of data transfer units connected to a switch interconnector, the switch interconnector for receiving requests from ones of the data transfer units as requesters for interconnection to associated ones of the data transfer units as receivers and for connecting the requesters as active requesters to the associated receivers as active receivers until the requests are completed as completed requests, the system further having a storage means for recording system status, predetermined ones of the data transfer units being capable of operating as both active requesters and active receivers such that deadlock situations can arise in which a first one of the data transfer units requests access to a second one of the data transfer units while the second one of the data transfer units requests access to the first one of the data transfer units, the improved method for avoiding deadlock situations comprising:

(a) receiving requests from ones of the data transfer units as requesters for interconnection to associated other ones of the data transfer units as receivers;

(b) temporarily disregarding any request in which the requester is an active receiver;

(c) temporarily disregarding any request in which the receiver is an active requester or an active receiver;

(d) selecting as the current request one of the requests that is not being temporarily disregarded;

(e) interconnecting the requester of said current request to the receiver of said current request through the switch interconnector, recording in the storage means that the requester of said current request is an active requester, and recording in the storage means that the receiver of said current request is an active receiver;

(f) determining if any request is a completed request, and if any request is a completed request then:
   (i) disconnecting the requester of the completed request from the switch interconnector,
   (ii) disconnecting the receiver of the completed request from the switch interconnector,
   (iii) recording in the storage means that the requester of the completed request is not an active requester, and
   (iv) recording in the storage means that the receiver of the completed request is not an active receiver; and (g) returning to said step (a).

12. For use in a system having a plurality of data transfer units connected to a switch interconnector, the switch interconnector for receiving requests from ones of the data transfer units as requesters for interconnection to associated ones of the data transfer units as receivers and for connecting the requesters as active requesters to the associated receivers as active receivers until the requests are completed as completed requests, the system further having a storage means for recording system status, predetermined ones of the data transfer units being capable of operating as both active requesters and active receivers such that deadlock situations could arise in which a first one of the data transfer units requests access to a second one of the data transfer units while the second one of the data transfer units requests access to the first one of the data transfer units, the improved method for avoiding deadlock situations comprising:

(a) receiving requests from ones of the data transfer units as requesters for interconnection to associated ones of the data transfer units as receivers, (b) temporarily disregarding any request from a requester that is an active receiver;

(c) selecting as the current request one of the requests that is not being temporarily disregarded, then:
   (i) interconnecting the requester of said current request to the switch interconnector as the current requester,
   (ii) selecting the receiver of said current request as the current receiver, and
   (iii) recording in the storage means that said current requester is an active requester;

(d) recording in the storage means that said current receiver is unavailable if said current receiver is an active requester or an active receiver, otherwise recording in the storage means that said current receiver is available;

(e) interconnecting said current receiver to said current requester through the switch interconnector and recording in the storage means that said current receiver is an active receiver if said current receiver is recorded as available in the storage means;

(f) determining if any request is a completed request, and if any request is a completed request then:
   (i) disconnecting the requester of the completed request from the switch interconnector,
   (ii) disconnecting the receiver of the completed request from the switch interconnector, (iii) recording in the storage means that the requester of the completed request is not an active requester, (iv) recording in the storage means that the receiver of the completed request is not an active receiver, and (g) returning to said step (d) if said current receiver is recorded as unavailable in the storage means, otherwise returning to said step (a).

13. For use in a system having a plurality of data transfer units connected to a switch interconnector, the switch interconnector for receiving requests from ones of the data transfer units as requesters for interconnection to associated ones of the data transfer units as associated receivers and for connecting the requesters as active requesters to the associated receivers as active receivers until the requests are completed as completed requests, the system further having a storage means for recording system status, predetermined ones of the data transfer units being capable of operating as both active requesters and active receivers such that deadlock situations can arise in which a first one of the data transfer units requests access to a second one of the data transfer units while the second one of the data transfer units requests access to the first one of the data transfer units, the improved method for avoiding deadlock situations comprising:

(a) receiving requests from ones of the data transfer units as requesters for interconnection to associated ones of the data transfer units as receivers, (b) temporarily disregarding requests from requesters that are active receivers;

(c) selecting as the current request one of the requests that is not being temporarily disregarded, interconnecting the requester of said current request to the switch interconnector as the associated requester, and recording in the storage means that said associated requester is an active requester;

(d) interconnecting said associated receiver to said associated requester through the switch interconnector and recording in the storage means that said associated receiver is an active receiver if said associated receiver is not an active requester or an active receiver, otherwise recording in the storage means that said associated receiver is not available if said associated receiver is an active requester or an active receiver;

(e) determining if any request is a completed request, and if a request is a completed request, then:
 (i) disconnecting the requester of said completed request from the switch interconnector,
 (ii) disconnecting the receiver of said completed request from the switch interconnector,
 (iii) recording in the storage means that the requester of said completed request is not an active requester, and
 (iv) recording in the storage means that the receiver of said completed request is not an active receiver; and (f) returning to said step (a) if the requester of said completed request and the receiver of said completed request are recorded as available in the storage means, otherwise recording in the storage means that the requester of said completed request and the receiver of said completed requester are available and returning to said step (d).

* * * * *